United States Patent Office 3,284,169
Patented Nov. 8, 1966

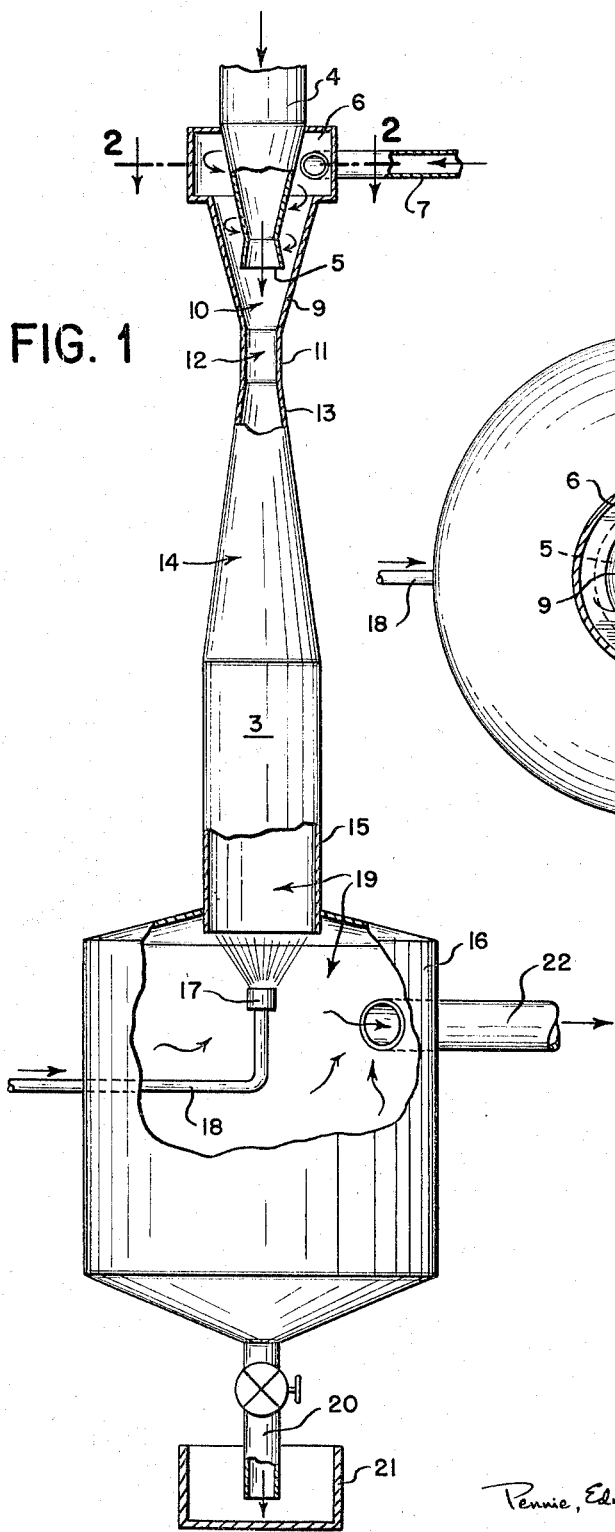
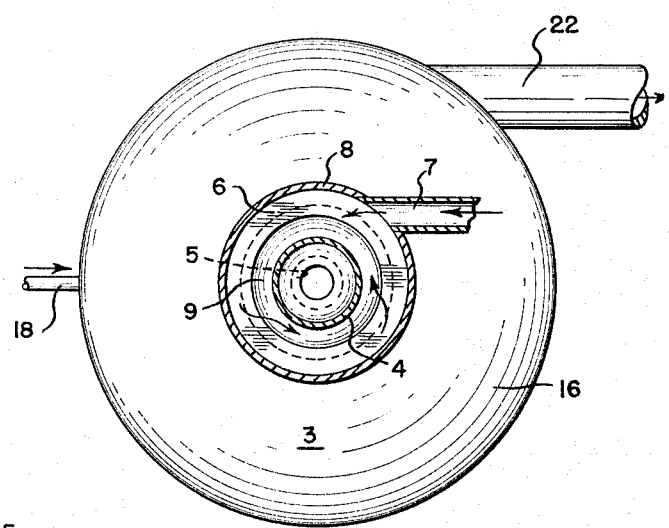

3,284,169
REACTOR EQUIPMENT FOR THE PRODUCTION OF TETRAFLUOROETHYLENE
Kenichi Tominaga, Yutaka Kimura, and Hiroshi Suzuki, Osaka, Japan, assignors, by mesne assignments, to Thiokol Chemical Corporation, Trenton, N.J., a corporation of Delaware
Filed Feb. 20, 1963, Ser. No. 259,868
Claims priority, application Japan, Feb. 21, 1962, 37/6,817
3 Claims. (Cl. 23—284)

This invention relates to chemical reactors, and more particularly, to a reactor for use in the production of tetrafluoroethylene. The principal object of the invention is to provide an improved reactor for the pyrolysis of chlorodifluoromethane to tetrafluoroethylene.

Tetrafluoroethylene is produced commercially by the pyrolytic decomposition of chlorodifluoromethane, which pyrolysis is believed to result in the formation of the difluoromethylene diradical, which, in turn, undergoes dimerization to tetrafluoroethylene, as illustrated by the following reaction sequence:

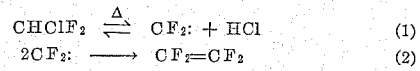

$$CHClF_2 \overset{\Delta}{\rightleftharpoons} CF_2: + HCl \quad (1)$$
$$2CF_2: \longrightarrow CF_2=CF_2 \quad (2)$$

The pyrolysis reaction, which is described in the United States patent to Downing et al. No. 2,384,821, granted September 18, 1945, is based on passing chlorodifluoromethane through an inert reaction tube at a temperature of between 600° C. and 1000° C., at which temperature, however, considerable degradation, telomerization and polymerization of reaction products occur. By introducing superheated steam into the reaction mixture to initiate pyrolysis reaction, which is endothermic, it is possible to increase the conversion of chlorodifluoromethane to tetrafluoroethylene and to reduce substantially the formation of the usual by-products. Steam-initiated pyrolysis of chlorodifluoromethane is usually carried out by introducing superheated steam at 1000° C. and chlorodifluoromethane, which is generally preheated to 400° C., into a straight tube where the pyrolysis reaction occurs at about 800° C.

Although the use of superheated steam to initiate the pyrolysis of chlorodifluoromethane reduces the usual by-products of this reaction, it presents rather difficult control problems because of the highly corrosive nature of the acidic reaction products and the unpredictable effects on reaction yields which are observed when the dimensions of the straight tube reactor are altered. For example, when equimolar proportions of chlorodifluoromethane (preheated to 400° C.) and superheated steam (at 1000° C.) are introduced into a straight tube reactor, the actual temperature in the reaction zone of the tube varying between 750° C. and 800° C., an increase in the diameter of the reactor tube results in a decrease in the yield of tetrafluoroethylene and a marked diminution in the percentage of the chlorodifluoromethane feedstock which undergoes reaction. The following table sets forth the results which are obtained when this steam-initiated pyrolysis of chlorodifluoromethane was carried out in reaction tubes of varying dimensions.

TABLE I.—THE EFFECT OF INCREASING THE DIAMETER AND LENGTH OF THE REACTOR TUBE UPON THE YIELDS OBTAINED IN THE STEAM-INITIATED PYROLYSIS OF CHLORODIFLUOROMETHANE

| Flow Rate of $CHClF_2$ (kg./hr.) | Reactor Tube Dimensions | | Percent Reacted | Yield (Percent) |
|---|---|---|---|---|
| | Diameter (Millimeters) | Length (Meters) | | |
| 0.5 | 10 | 0.4 | 65–70 | 90–95 |
| 10 | 30 | 0.8 | 60–65 | 85–90 |
| 80 | 60 | 1.5 | 40–50 | 70–80 |

In all probability, increasing the diameter and the length of the reaction tubes results firstly, in poor contact between the chlorodifluoromethane and superheated steam, the temperature and viscosity of the reaction mixture probably being non-uniform throughout the reaction zone, secondly, in the initiation of gaseous polymerization, and thirdly, in uneven cooling beyond the reaction zone. Consequently, the viscosity, temperature and retention time of the reaction mixture are higher than the optimum conditions which are required for the maximum conversion of chlorodifluoromethane to tetrafluoroethylene, resulting instead in the lower yields and increased by-product formation which occur when the dimensions of the reactor tubes are increased or sealed-up. To avoid these disadvantages in the commercial production of tetrafluoroethylene, the reactor equipment is generally constructed by using multiple, small, double-wall tubes, which, because of the high corrosive nature of the reaction and high reaction temperatures (800° C.) are very difficult to fabricate.

Following the exhaustive investigation which was conducted by our colleagues and ourselves at the laboratories of Osaka Kinzoku Kogyo Co., Ltd., Osaka, Japan, into the steam-initiated pyrolysis of chlorodifluoromethane, we have developed an improved reactor for the production of tetrafluoroethylene. This reactor comprises an enclosed reaction vessel which structurally defines four interconnected and consecutively positioned zones, namely (i) a mixing zone, (ii) a reaction zone, (iii) an adiabatic expansion zone, and (iv) a cooling zone. The mixing zone of the reaction vessel is provided with a steam-jet injection nozzle for introducing superheated steam and with inlet means for introducing the chlorodifluoromethane, while the cooling zone is provided with means for rapidly quenching or cooling the reaction gases which exit from the adiabatic expansion zone. Means are also provided in the cooling zone for withdrawing the impure tetrafluoroethylene and unreacted chlorodifluoromethane, and for removing the strongly corrosive by-product hydrochloric acid and coolant.

Several prominent features of the reactor of the invention lie in the critical relationships of the physical dimensions of the reaction zone and the adiabatic expansion zone, and in the position of the quenching or cooling means in the cooling zone with respect to the terminus of the adiabatic expansion zone, where the hot reaction gases exiting from such zone are rapidly cooled or quenched to prevent side reactions.

The preferred embodiment of the invention is described below with reference to the accompanying drawing, in which FIG. 1 is a side elevation, partly in section, of the reactor of the invention, showing the four interconnected and consecutively positioned zones; and FIG. 2 is a section taken substantially along line 2—2 of FIG. 1.

Referring to FIG. 1 of the drawing the reactor of the invention comprises a vertically-mounted, enclosed reaction vessel 3 through the top of which downwardly extends a steam-jet injection nozzle 4 having a diffusion lip 5. Concentrically disposed about the steam-jet injection nozzle 4 is a fully enclosed inlet manifold chamber 6 into which chlorodifluoromethane may be introduced through an inlet pipe 7. As shown in FIG. 2, the inlet pipe 7 communicates with the interior of the inlet manifold chamber 6 in such manner that the inlet pipe 7 is adjacent to and substantially tangential with the peripheral wall 8 of the inlet manifold chamber 6.

Extending downwardly from the bottom of the inlet manifold chamber 6 and concentric therewith is a conical wall 9 which defines a mixing zone 10. The conical wall 9 surrounds and extends beneath the diffusion lip 5 of the steam-jet injection nozzle 4 in spaced relation therewith such that the vacuum which is created by injecting superheated steam into the reactor draws chlorodifluoromethane through the inlet pipe 7 into the inlet manifold chamber 6 from which the chlorodifluoromethane cyclonically drops into the injected superheated steam issuing from the diffusion lip 5; turbulent and complete mixing of the chlorodifluoromethane with the superheated steam occurs in the mixing zone 10.

Immediately below and integral with the conical wall 9 which defines this mixing zone 10 extends a short cylindrical tube 11 which functions as a Venturi-throat through which the mixed chlorodifluoromethane-steam reaction gases pass and which defines a reaction zone 12. Initiation of the pyrolytic reaction is believed to commence in this reaction zone 12.

Depending from the lower end of the short cylindrical tube 11 is a second conical wall 13 which is also axially disposed with respect to the steam-jet injection nozzle 4 and which diverges in diameter from its upper to its lower end. The entire length of this second conical wall 13 defines an adiabatic expansion zone 14 through which the hot reaction gases exiting from the reaction zone 12 undergo adiabatic expansion.

Although the physical dimensions of the adiabatic expansion zone 14 are dependent upon several variables, such as (i) the temperature of the superheated steam injected into the reactor, (ii) the ratio of chlorodifluoromethane to superheated steam initially present in the reaction mixture, and (iii) the flow-rate of the hot reaction gases exiting from the reaction, it is absolutely imperative that the shape and physical dimensions of the adiabatic expansion zone insure adiabatic expansion of the hot reaction gases. Adiabatic expansion of the hot reaction gases prevents any resorbtion of heat by the reaction gases, which resorbtion causes telomerization and polymerization of the pyrolysate and reduces the yields of tetrafluoroethylene. Consequently, the second conical wall 13 should diverge linearly at an angle from 5° to 25° from the axis of the reaction zone 12 (the actual angle of divergence being dependent upon the aforementioned variables). In addition, the cross-sectional area of the lower end of the adiabatic expansion zone 14 should be from 5 to 20 times that of the reaction zone 12, the ratio of about 10:1 being preferable.

At the lower end of the adiobatic expansion zone 14, the conical wall 13 communicates directly with a second cylindrical tube 15 (which is co-axial therewith) the lower end of which opens into a tank 16. Facing axially up into this cylindrical tube 15 is a spray nozzle 17 from which a coolant is forcibily injected into and countercurrent to the flow of reaction gases passing downwardly through the cylindrical tube 15. This coolant is supplied to the spray nozzle 17 by means of a pipe 18 extending into the tank 16, which completely surrounds the spray nozzle 17. The lower portion of cylindrical tube 15 together with the tank 16 into which it opens form a cooling zone 19 in which the temperature of the reaction gases is rapidly lowered from about 800° C. to a temperature not in excess of about 200° C.

A valved drain 20 is provided at the bottom of the tank 16 to withdraw the highly corrosive by-product hydrochloric acid and coolant, and flows into a drain sump 21. An outlet pipe 22, communicating with the interior of the tank 16 above the highest contemplated level at which by-product hydrochloric acid and coolant can accumulate, is provided for the recovery of tetrafluoroethylene and unreacted chlorodifluoromethane.

Inasmuch as the steam-initiated pyrolysis of chlorodifluoromethane is conducted at temperatures ranging from 600° C. to 1000° C., and yields a hot highly corrosive by-product hydrochloric acid, the reactor of the invention should be constructed of a suitable corrosion-resistant material able to withstand the high operating temperatures, and clad internally with platinum or fused silica.

To illustrate the effectiveness with which the reactor of the invention may be used in the production of tetrafluoroethylene from chlorodifluoromethane, Table II sets forth the results obtained using the reactor of the invention in six examples in which equal weights of superheated steam (at 1100° C.) and chlorodifluoromethane (preheated to 400° C.) underwent pyrolysis, changing only the cross-sectional area of the reaction zone, and the dimensions of the adiabatic expansion zone in each instance.

TABLE II.—EFFECT OF VARYING THE PHYSICAL DIMENSIONS OF THE ADIABATIC EXPANSION ZONE ON THE YIELDS OF THE STEAM-INITIATED PYROLYSIS OF CHLORODIFLUOROMETHANE

| No. | Flow Rate of $CHClF_2$ (kg./hr.) | Diameter of Reaction Zone (mm.) | Diameter of Lower End of Adiabatic Expansion Zone (mm.) | Length of Adiabatic Expansion Zone (mm.) | $CHClF_2$ Reacted (Percent) | $CF_2=CF_2$ Yield (Percent) |
|---|---|---|---|---|---|---|
| 1 | 6 | 6 | 18 | 190 | 70-80 | 90-95 |
| 2 | 4.5 | 6 | 18 | 190 | 80-85 | 89-93 |
| 3 | 13 | 10 | 30 | 220 | 70-80 | 92-97 |
| 4 | 10 | 10 | 30 | 220 | 75-85 | 88-95 |
| 5 | 40 | 20 | 60 | 250 | 70-80 | 92-98 |
| 6 | 30 | 20 | 60 | 250 | 75-85 | 90-96 |

In another test of the reactor of the invention, superheated steam at 1100° C. and a pressure of 0.2 kg./cm.²g. was injected into the reactor together with chlorodifluoromethane which had been preheated to 400° C., the superheated steam representing 80 mol percent of the converging reaction mixture in the reaction zone. The temperature of the reaction mixture in the reaction zone was maintained at 800° C. Using a flow rate for chlorodifluoromethane of 13 kg./hr., and an adiabatic expansion zone having an angle of divergence (measured from the axis of the reaction zone) of 10°, a total length of 220 mm., an upper diameter (which is the same as that of the reaction zone 12) of 10 mm., and a lower diameter (which is the same as that of the cylindrical tube 15) or 30 mm., the ratio of criss-sectional areas of the reaction zone 12 to the cylindrical tube 15 being 1:9, the pyrolysis of chlorodifluoromethane yielded tetrafluoroethylene in 95 percent of theory, based on the amount (76 percent by weight) of chlorodifluoromethane which underwent reaction.

We claim:

1. A reactor for the production of tetrafluoroethylene by the steam-initiated pyrolysis of chlorodifluoromethane, comprising a vertically-mounted enclosed reaction vessel having consecutively positioned and interconnected therewithin a mixing zone, a reaction zone, an adiabatic expansion zone, and a cooling zone, a steam-jet injection nozzle having a diffusion lip extending downwardly through the top of the reaction vessel into the mixing zone, a fully enclosed inlet manifold chamber concentrically disposed about the steam-jet injection nozzle, inlet means for cyclonically introducing preheated chlorodifluoromethane into the inlet manifold chamber above the diffusion lip of the steam-jet injection nozzle, spray cooling means for quenching the cooling zone the hot reaction gases which exit from the adiabatic expansion zone, means for withdrawing tetrafluoroethylene and other gaseous reaction products from the cooling zone, and means for withdrawing by-product hydrochloric acid and coolant from the cooling zone, the mixing zone being defined by a conical wall of the reaction vessel extending downwardly from the bottom of the inlet manifold chamber and surrounding the diffusion lip of the steam-jet injection nozzle and converging to a cylindrical Venturi-throat, the reaction zone being defined by the wall of said cylindrical Venturi-throat, and the adiabatic expansion zone being defined by a second conical wall of the reaction vessel diverging in diameter from its upper to its lower end, the conical wall defining the mixing zone, the cylindrical Venturi-throat defining the reaction zone, and the second conical wall defining the adiabatic expansion zone all being axially disposed with respect to the steam-jet injection nozzle, the length of the adiabatic expansion zone and the ratio of the cross-sectional areas of the upper end to that of the lower end of the adiabatic expansion zone being sufficient to permit adiabatic expansion of the hot chlorodifluoromethane-steam recation gases which exit from the reaction zone.

2. A reactor for the production of tetrafluoroethylene by a steam-initiated pyrolysis of chlorodifluoromethane, comprising a vertically-mounted enclosed reaction vessel having consecutively positioned and interconnected therewithin a mixing zone, a reaction zone, an adiabatic expansion zone, and a cooling zone, a steam-jet injection nozzle having a diffusion lip extending downwardly through the top of the reaction vessel into the mixing zone, a fully enclosed inlet manifold chamber concentrically disposed about the steam-jet injection nozzle, inlet means for cyclonically introducing preheated chlorodifluoromethane into the inlet manifold chamber above the diffusion lip of the steam-jet injection nozzle, spray cooling means for quenching in the coling zoe the hot reaction gases which exit from the adiabatic expansion zone, means for withdrawing tetrafluoroethylene and other gaseous reaction products from the cooling zone, and means for withdrawing by-product hydrochloric acid and coolant from the cooling zone, the mixing zone being defined by a conical wall of the reaction vessel extending downwardly from the bottom of the inlet manifold chamber and surrounding the diffusion lip of the steam-jet injection nozzle and converging to a cylindrical Venturi-throat, the reaction zone being defined by the wall of said cylindrical Venturi-throat, and the adiabatic expansion zone being defined by a second conical wall of the reaction vessel diverging in diameter from its upper to its lower end, the conical wall defining the mixing zone, the cylindrical Venturi-throat defining the reaction zone, and the second conical wall defining the adiabatic expansion zone all being axially disposed with respect to the steam-jet injection nozzle, the angle of divergence of the second conical wall defining the adiabatic expansion zone, when measured with respect to the axis of said adiabatic expansion zone, being in the range from 5° to 25° and the ratio of the cross-sectional area of the upper end to that of the lower end of the adiabatic expansion zone being in the range from 1:5 to 1:20.

3. A reactor for the production of tetrafluoroethylene by the steam-initiated pyrolysis of chlorodifluoromethane, comprising a vertically-mounted enclosed reaction vessel having consecutively positioned and interconnected therewithin a mixing zone, a reaction zone, an adiabatic expansion zone, and a cooling zone, a steam-jet injection nozzle having a diffusion lip extending downwardly through the top of the reaction vessel into the mixing zone, a fully enclosed inlet manifold chamber concentrically disposed about the steam-jet injection nozzle, inlet means for cyclonically introducing preheated chlorodifluoromethane into the inlet manifold chamber above the diffusion lip of the steam-jet injection nozzle, spray cooling means for quenching in the cooling zone the hot reaction gases which exit from the adiabatic expansion zone, means for withdrawing tetrafluoroethylene and other gaseous reaction products from the cooling zone, and means for withdrawing by-product hydrochloric acid and coolant from the cooling zone, the mixing zone being defined by a conical wall of the reaction vessel extending downwardly from the bottom of the inlet manifold chamber and surrounding the diffusion lip of the steam-jet injection nozzle and converging to a cylindrical Venturi-throat, the reaction zone being defined by the wall of said cylindrical Venturi-throat, and the adiabatic expansion zone being defined by a second conical wall of the reaction vessel diverging in diameter from its upper to its lower end, the conical wall defining the mixing zone, the cylindrical Venturi-throat defining the reaction zone, and the second conical wall defining the adiabatic expansion zone all being axially disposed with respect to the steam-jet injection nozzle, the angle of divergence of the second conical wall defining the adiabatic expansion zone, when measured with respect to the axis of said adiabatic expansion zone, being about 10° and the ratio of the cross-sectional area of the upper end to that of the lower end of the adiabatic expansion zone being about 1:10.

References Cited by the Examiner

UNITED STATES PATENTS

| | | | |
|---|---|---|---|
| 2,747,974 | 5/1956 | Felger | 23—284 |
| 2,790,838 | 4/1957 | Schrader | 23—259.5 X |
| 2,907,644 | 10/1959 | Cunningham et al. | 23—284 |
| 2,941,012 | 6/1960 | Forshay | 260—653.3 |
| 2,994,723 | 8/1961 | Scherer et al. | 260—653.3 |

MORRIS O. WOLK, *Primary Examiner.*

JAMES H. TAYMAN, JR., *Assistant Examiner.*

UNITED STATES PATENT OFFICE
CERTIFICATE OF CORRECTION

Patent No. 3,284,169                                            November 8, 1966

Kenichi Tominaga et al.

It is hereby certified that error appears in the above numbered patent requiring correction and that the said Letters Patent should read as corrected below.

Column 2, line 33, for "high" read -- highly --; column 4, line 9, for "adiobatic" read -- adiabatic --; column 5, line 1, for "or" read -- of --; line 2, for "criss-sectional" read -- cross-secitonal --; line 22, after "quenching" insert -- in --; line 41, for "areas" read -- area --; line 44, for "recation" read -- reaction --; line 59, for "coling zoe" read -- cooling zone --.

Signed and sealed this 12th day of September 1967.

(SEAL)
Attest:

ERNEST W. SWIDER                                      EDWARD J. BRENNER
Attesting Officer                                             Commissioner of Patents